United States Patent
Mackay et al.

(10) Patent No.: US 8,878,109 B2
(45) Date of Patent: Nov. 4, 2014

(54) PACKAGE CONVEYOR FOR CONTINUOUS PROCESS MICROWAVE APPLICATOR

(76) Inventors: Jeffrey H. Mackay, San Diego, CA (US); Thomas D. Wendel, Nashua, NH (US); E. Eugene Eves, II, Westford, MA (US)

(*) Notice: Subject to any disclaimer, the term of this patent is extended or adjusted under 35 U.S.C. 154(b) by 1571 days.

(21) Appl. No.: 12/313,146

(22) Filed: Nov. 17, 2008

(65) Prior Publication Data

US 2010/0072194 A1 Mar. 25, 2010

Related U.S. Application Data

(60) Provisional application No. 61/192,687, filed on Sep. 19, 2008.

(51) Int. Cl.
*H05B 6/64* (2006.01)
*A21B 3/13* (2006.01)
*H05B 6/78* (2006.01)

(52) U.S. Cl.
CPC ..................... *H05B 6/782* (2013.01)
USPC ........... 219/679; 219/700; 219/762; 219/680; 219/678; 219/748; 99/324; 99/421 R; 99/423; 99/443 R; 99/443 C

(58) Field of Classification Search
CPC ..................................................... H05B 6/782
USPC ......... 219/700, 762, 679, 680, 678, 690, 691, 219/725, 730, 744, 748; 99/324, 421 R, 423, 99/443 R, 443 C
See application file for complete search history.

(56) References Cited

U.S. PATENT DOCUMENTS

| | | | |
|---|---|---|---|
| 3,138,239 A * | 6/1964 | Ackerman et al. ............ | 198/562 |
| 3,152,535 A | 10/1964 | Pollak, Jr. et al. | |
| 3,564,187 A | 2/1971 | Smith | |
| 3,690,444 A | 9/1972 | Chassang | |
| 3,819,030 A | 6/1974 | Warner | |
| 3,885,915 A | 5/1975 | Utsumi et al. | |
| 3,974,353 A * | 8/1976 | Goltsos ........................ | 219/700 |
| 4,441,003 A * | 4/1984 | Eves et al. .................... | 219/700 |
| 5,044,264 A | 9/1991 | Forney | |

(Continued)

FOREIGN PATENT DOCUMENTS

JP  2000-306661  11/2000

OTHER PUBLICATIONS

Office Communication, Mail Date: Apr. 22, 2009, U.S. Appl. No. 11/209,894, First Named Inventor: Randall S. Masson.

(Continued)

*Primary Examiner* — Dana Ross
*Assistant Examiner* — Ket D Dang
(74) *Attorney, Agent, or Firm* — David G. Duckworth; Russo & Duckworth, LLP

(57) ABSTRACT

A mechanism for constraining a product package as it is conveyed through a microwave applicator. In one preferred embodiment, the conveyor is provided by a pair of parallel guide belts arranged to travel through a microwave applicator. The guide belts have a series of slots or other guide elements formed therein. The guide elements engage edges of the product packages. In one arrangement, the pair of belts are disposed on either side of a series of packages, and thus constrain the location of the packages in three dimensions.

3 Claims, 10 Drawing Sheets

(56) References Cited

U.S. PATENT DOCUMENTS

| | | | |
|---|---|---|---|
| 5,132,504 A * | 7/1992 | Iijima | 219/680 |
| 5,160,819 A | 11/1992 | Ball et al. | |
| 5,239,917 A | 8/1993 | Lutkie et al. | |
| 5,510,601 A * | 4/1996 | Smith et al. | 219/679 |
| 5,512,312 A | 4/1996 | Forney et al. | |
| 5,942,142 A | 8/1999 | Forney et al. | |
| 6,153,868 A | 11/2000 | Marzat | |
| 6,323,473 B1 * | 11/2001 | Yamamoto et al. | 219/771 |
| 6,499,274 B1 * | 12/2002 | McDonald et al. | 53/434 |
| 6,867,392 B1 | 3/2005 | Howard | |
| 7,119,313 B2 * | 10/2006 | Tang et al. | 219/700 |
| 7,331,161 B2 * | 2/2008 | Buchko | 53/432 |
| 2003/0037514 A1 | 2/2003 | Hartness et al. | |
| 2003/0155351 A1 | 8/2003 | Vilo | |
| 2006/0231550 A1 * | 10/2006 | Wendel et al. | 219/700 |

OTHER PUBLICATIONS

Office Communication, Mail Date: Mar. 10, 2009, U.S. Appl. No. 11/335,837, First Named Inventor: Thomas D. Wendel.

Office Communication, Mail Date: Nov. 24, 2008, U.S. Appl. No. 11/209,894, First Named Inventor: Randall S. Masson.

Office Communication, Mail Date: Jul. 16, 2008, U.S. Appl. No. 11/335,837, First Named Inventor: Thomas D. Wendel.

Office Communication, Mail Date: Mar. 17, 2008, U.S. Appl. No. 11/209,894, First Named Inventor: Randall S. Masson.

Office Communication, Mail Date: Aug. 1, 2007, U.S. Appl. No. 11/209,894, First Named Inventor: Randall S. Masson.

* cited by examiner

PACKAGE CONVEYOR FOR CONTINUOUS PROCESS MICROWAVE APPLICATOR

RELATED APPLICATION(S)

This application claims the benefit of U.S. Provisional Application No. 61/192,687, filed on Sep. 19, 2008. The entire teachings of the above application(s) are incorporated herein by reference.

BACKGROUND OF THE INVENTION

The present invention relates to a conveyance system for use in microwave processing of products such as, for example, the sterilization and/or cooking of food articles, and in particular to a constraint mechanism for holding conveyed items in place providing minimal mechanical interference with the microwave energy applied to improve the uniformity of results in such systems.

The processing of products with microwave energy, such as needed for cooking, sterilization, and similar operations, involves placing the product within some sort of enclosed waveguide applicator for a time. Many different approaches have been tried to improve the uniformity of results in such systems. These usually involve carefully designing the shape of the waveguide applicator.

For large scale, high volume, commercial applications, it is typically desirable to process as many items in as short a time as possible. In these situations, it is common to use a continuous conveyor to transport items through the applicator. Conveyor belts made of materials that are suitable for use in such environments are well known. For example, materials such as Teflon™, Kevlar™ or fiberglass have been used for conveyors in microwave ovens.

In addition to ensuring that the microwave applicator is of proper dimension, it is also important to ensure that the position of the product with respect to the waveguide is carefully controlled. There is no advantage to having a precisely dimensioned microwave applicator if consistent positioning of the product within the applicator cannot be assured as it travels through the applicator. If the product moves up and down or from side to side while being conveyed through the applicator, uneven results will occur.

One manner of constraining conveyed packaged items is described in a co-pending U.S. patent application Ser. No. 11/335,837, filed Jan. 19, 2006 (U.S. Patent Publication No. 2006/0231150) entitled "Product Guidance System for Continuous Conveyor Microwave Oven", which is assigned to The Ferrite Company, Inc. The approach in that system was to use a series of fixed wire guides located adjacent the conveyor.

Many different approaches have been attempted, all of which utilize a mechanical structure that spans the microwave exposure area with some form of traditional conveyor belt or other transport mechanisms. These methods introduce significant mechanical structures into the microwave heating area (ie. Kevlar mesh belts, plastic link belts or other plastic cradle structures) causing interference with the microwave field and loss of uniformity in heating. The benefits of a carefully designed waveguide applicators are diminished by undesirable interaction with the microwave energy created by the mechanical structures.

SUMMARY OF THE INVENTION

The present invention relates to mechanisms for constraining a product package and conveying it through a microwave applicator. In one preferred embodiment herein, the conveyor is provided by a pair of parallel guide belts utilizing the structure of the conveyed product. The guide belts are arranged to travel through a microwave applicator. The guide belts have a series of slots or other guide elements formed therein that engage the edges of the product packages. By disposing the pair of belts, one on either side of a series of packages, the packages are supported and the location of the packages is constrained in three dimensions as they pass through a microwave applicator. Advantageously, no additional mechanical support is required for engaging and supporting the packages in the vertical direction or for transporting the packages horizontally through a liquid or gaseous environment within a microwave processing chamber.

Tensioning is preferably provided to both hold the belts in place and to provide a drive mechanism to create the conveyor. This can be provided by a series of pulleys driven by a motor.

In a preferred arrangement, the portions of the drive mechanisms located within the applicator section is ideally limited to including essentially the belt portions. This avoids introducing undesirable interaction with the microwave energy applicator. The belts themselves are thus preferably made of a suitable material that is temperature, fluid and microwave energy insensitive. Teflon™, Kevlar™ and fiberglass are examples of suitable materials. Polyprophelene and polyethylene are probably not as suitable as other materials.

The pulley may have sprockets that engage holes formed in the drive belts. This provides further positive drive engagement, and avoids belt slippage under weight of the conveyed packages.

In one embodiment, the packages can have specially shaped tabs on the outer periphery. The tabs are shaped to better engage the slots in the belts, reduce variation in package positioning and reduce tension requirements on the belts.

In optional arrangements non-rigid packages are conveyed utilizing tabs or slots on the periphery. These are engaged by an alternate belt configuration that grasps the integrated features for tensioned conveyance between the belts.

In optional arrangements, tension measurement devices and other devices such as motion transducers may be used in combination with the belt to provide feedback on package location and condition. The tension measurement devices can be located preferably outside the active area of the applicator but can also be provided within it.

There are several benefits provided by a conveyed product guidance system according to the present invention.

Elimination of significant mechanical structures for supporting and transporting the packages in the microwave heating area reduces interference with the applied microwave energy and resulting in improved uniformity in microwave heating.

The constraint mechanism maintains the location of product packages in three dimensions without additional mechanical support while they travel through a microwave applicator. This improves the uniformity of microwave processing of packaged articles.

In environments where products must also travel through water, vegetable oil or other fluids while being processed such as is useful for example, pasteurizing the same, turbulence is introduced or increased by the movement of the conveyor belts, thereby improving mixing and heat transfer.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
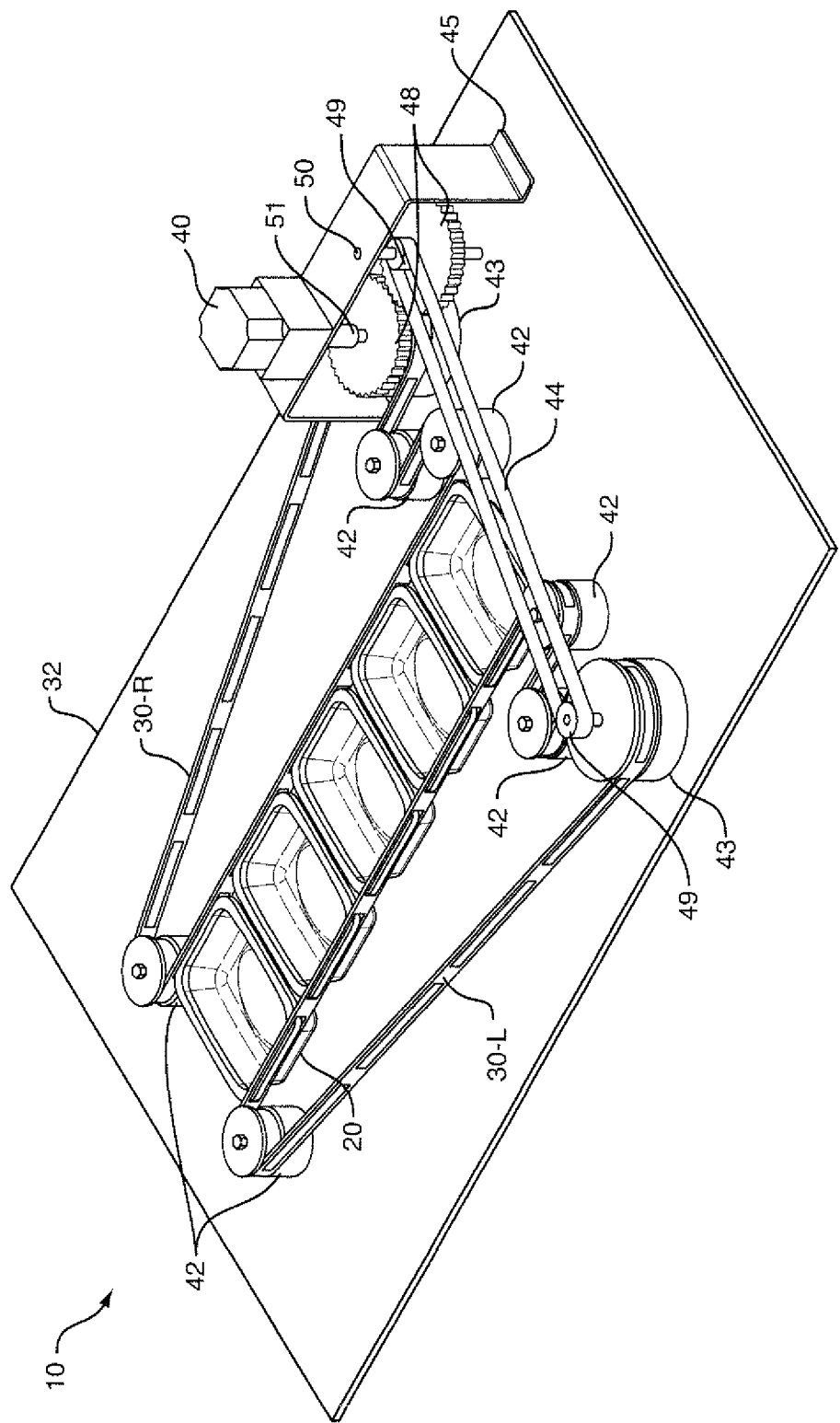
FIG. 1 is an isometric view of a package conveyor.

FIG. 1 is an isometric view of a product conveyor system 10. The system 10 is disposed within a microwave applicator (not shown) which may be designed according to any of the techniques described in U.S. Pat. No. 7,002,122, entitled "Choke Assembly for Continuous Conveyor Microwave Oven" and/or U.S. Pat. No. 7,256,377, entitled "Coupled-Waveguide Microwave Applicator for Uniform Processing,", both of which are incorporated herein by reference, and/or other known techniques for constricting continuous feed microwave applicators.

Conveyor system 10 is generally employed to cause items such as packaged food trays 20 (also called the "packages" herein) to be conveyed through a confined area such as a microwave cavity. Although a conveyor belt 30 portion of system 10 itself is mostly disposed within the cavity, as will be understood shortly, certain other portions, such as motor 40, may be advantageously disposed outside of the cavity.

More particularly, a conveyor system 6 consists primarily of a pair of belts 30-L and 30-R. The conveyor belts 30 are supported above a base 32 portion of the applicator (the other walls of the applicator are not shown for clarity). Conveyor belts 30 in turn support packages 20 such that the packages 20 are spaced above the base 32.

A motor 40 and series of belts, gears, and pulleys are used to drive the pair of conveyor belts 30 in synchronism. In particular, these may include a timing belt 44 and first timing belt pulley 49 coupled to motor 40 via drive gears 48 and drive shaft 50. A second timing belt pulley 49 on the far side operates belt drive roller 43. Belt drive roller 43 and various belt guide rollers 42 further provide movement and support for the conveyor belts 30.

As illustrated, the motor 40 may be supported by motor bracket 45 on base plate 32 above gears 48, pulley 49 and drive shaft 50, but it should be understood that other arrangements are possible.

In operation, a left hand belt 30-L is continuously fed around its respective guide rollers 42 and drive roller 43 (driven by timing belt 44), and a respected right hand belt 30-R is continuously fed around its respective drive roller 43 (driven by one of the gears 48) and its respective guide rollers 42. Left hand belt 30-L and right hand belt 30-R are thus kept in alignment with one another via gears 48, pulleys 49 and timing belt 44. This is necessary to ensure that the packages 20 are conveyed in an orderly fashion.

Figure 2:
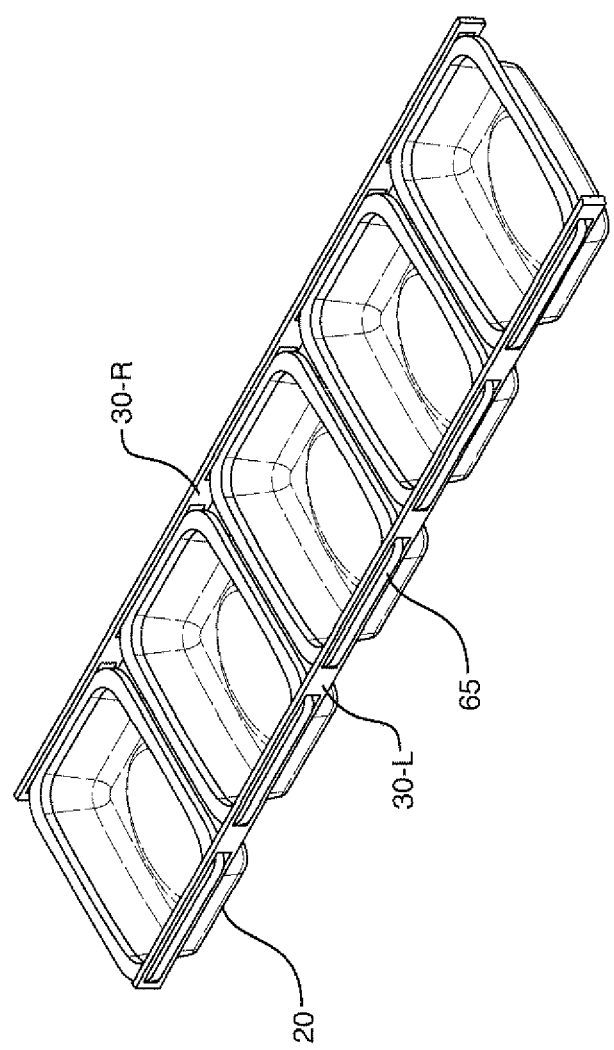
FIG. 2 is a more detailed view of a pair of conveyor belts and how they engage the product packages.

FIG. 2 is a more detailed view of the manner in which the trays 30 are supported by the pair of belts 30-L and 30-R.

Figure 3:
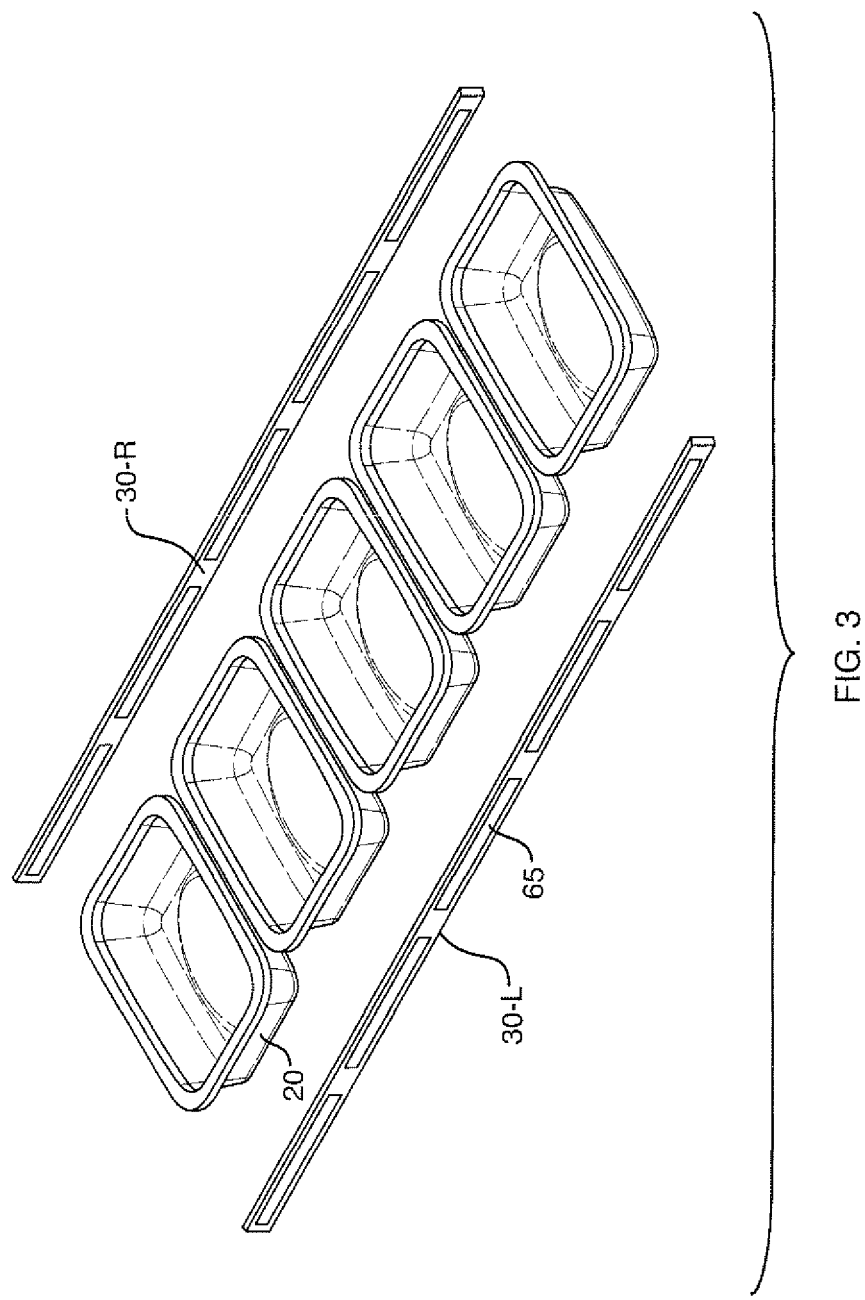
FIG. 3 is an exploded view of the conveyor belts and packages.

FIG. 3 is an exploded view similar to that of FIG. 2. It is more evident in this view that each of the conveyor belts 30 has formed therein slots 60 spaced apart from one another. The size of the slots 60 correspond to the sizes of peripheral edges of the trays 20. Thus a side (or edge) portion of each package 20, as indicated by reference number 65 in FIG. 2, protrudes through a hole 60 on each respective left and right hand side.

Figure 4:
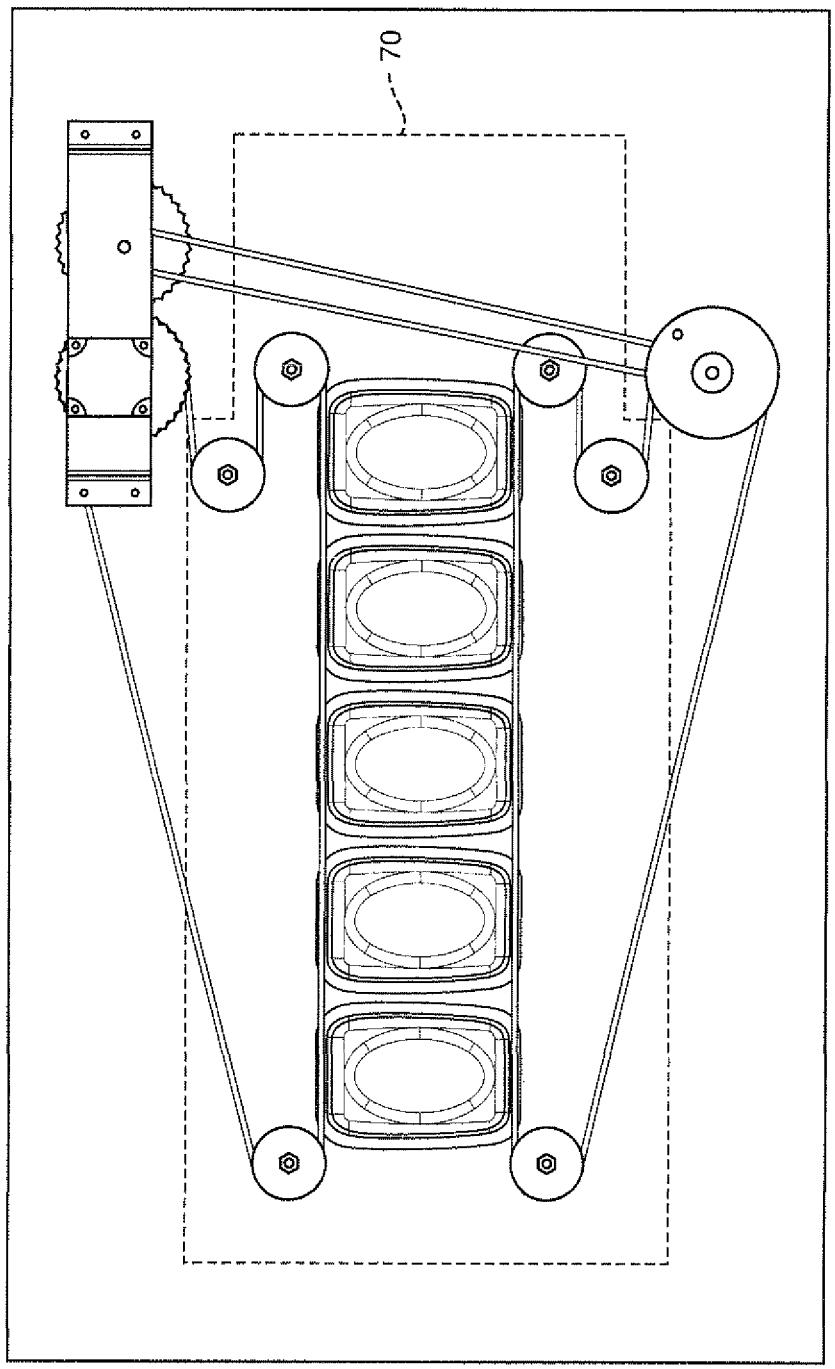
FIG. 4 is a top view of the package conveyor.

FIG. 4 is a top view of the arrangement of packages 20, conveyer belts 30, guidance rollers 42, and motor 60, showing portions of the apparatus 10 that may be disposed within the cavity 70. As indicated by dotted lines in FIG. 4, motor 40, brackets 45, drive pulleys 43, etc. are preferably placed outside the cavity, only belts 30 and guidance rollers 42 are within cavity 70.

Figure 5:
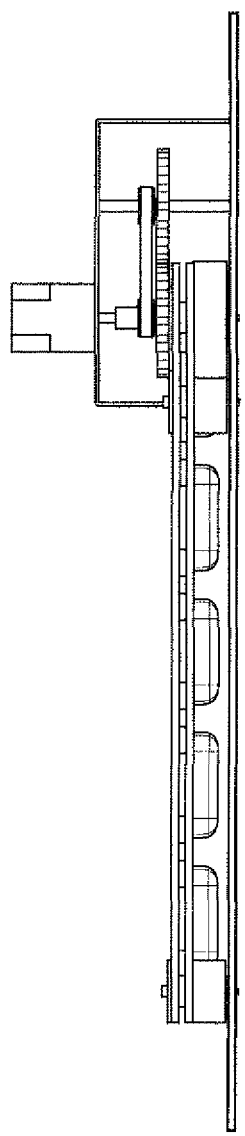
FIG. 5 is a side view of the package conveyor.

FIG. 5 is a side view illustrating how conveyor 10 holds packages 20 above the bottom 32 of cavity 70. The containers themselves may or may not be specially designed and the sizes of the slots 60 are chosen to correspond to the dimensions of the edges of trays 20.

It is furthermore advantageous to have as thin a cross-section belt 30 as possible, such that it will not alter the electromagnetic fields within the applicator. Materials for the conveyor should also be chosen to be relatively strong, as a relatively long length conveyor may be needed. Teflon™, Kevlar™, fiberglass and other microwave-inert materials are suitable for belts 30 and guidance rollers 42

A further advantage is provided by the individual slots 60. Even if there is a change in the volume of one package, i.e., a sealed package is breached for some reason during cooking, the disturbance of a given package will not necessarily effect orderly conveyance of its neighbor packages through the applicator.

Therefore, in an optional arrangement, a tension measurement device or other device such as a motion transducer may be used in combination with the belts 30 to provide feedback on package location and condition. The tension measurement devices can be located as part of one of the guidance rollers 42 within the cavity 70 or may be part of one of the drive pulleys 42 located outside the active area of the applicator.

For some end uses, the size of the belts 30 may need to be somewhat long. This can be to accommodate larger sized packages 20, a larger microwave applicator, or for other reasons. In such instances, the belts alone 30 may not adequate to support the weight of the trays 20, in which case the belts may sag.

Figure 6:
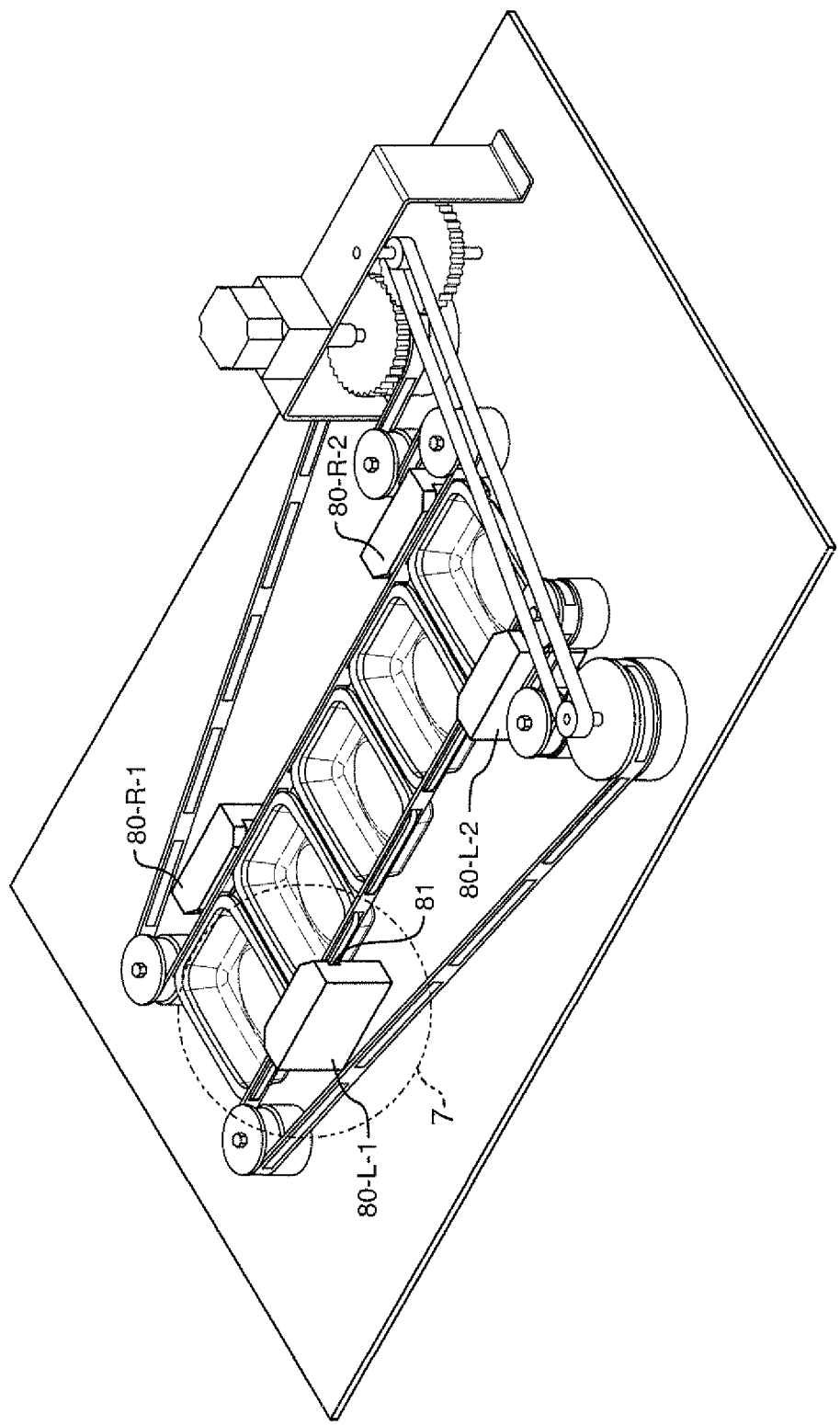
FIG. 6 is an isometric view of a package conveyor using supports.

To prevent this for happening, conveyor supports may be added. One preferred implementation, shown in FIG. 6, has two supports 80-L-1, 80-L-2 holding up the left side and two supports 80-R-1 and 80-R-2 holding up the right side. Note that in this preferred arrangement, supports 80 have longitudinal notches 81 that are intended to engage the side edges 65 of packages 20 and not the belts 30 themselves.

Figure 7:
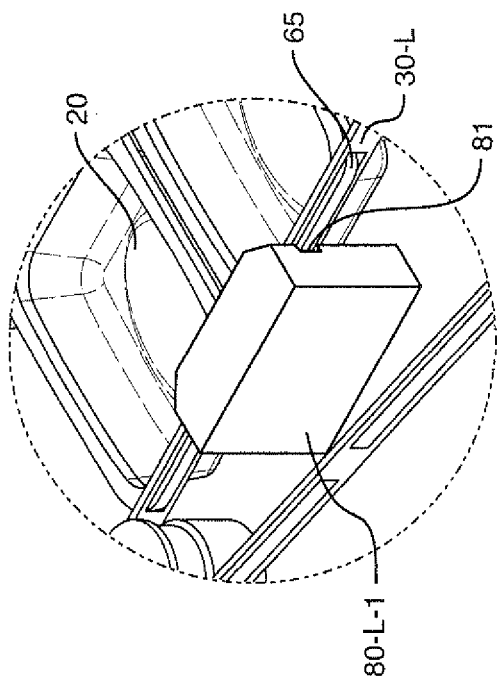
FIG. 7 is a more detailed view showing how a notch in a support relates to an edge of the packages.

FIG. 7 shows the notch and package edge 65 in more detail.

Figure 8:
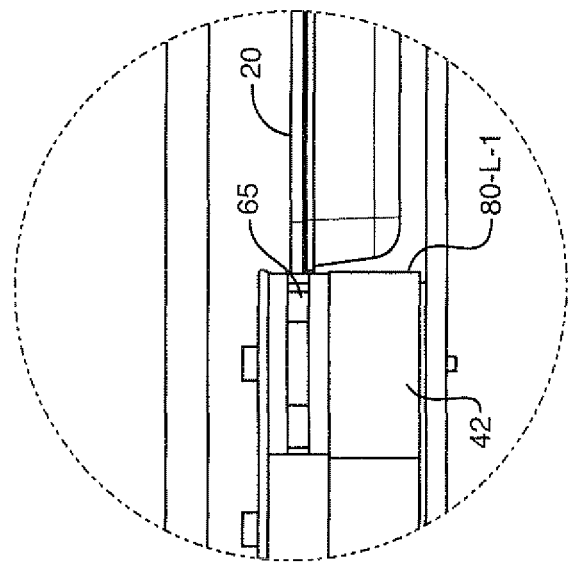
FIG. 8 is a detailed cross sectional view of a support and package.

FIG. 8 is a cross sectional view of the support 80 and package 20.

In certain embodiments, the packages 20 may have edges 65 that have a shape specifically adapted to engage the slots 60.

Figure 9:
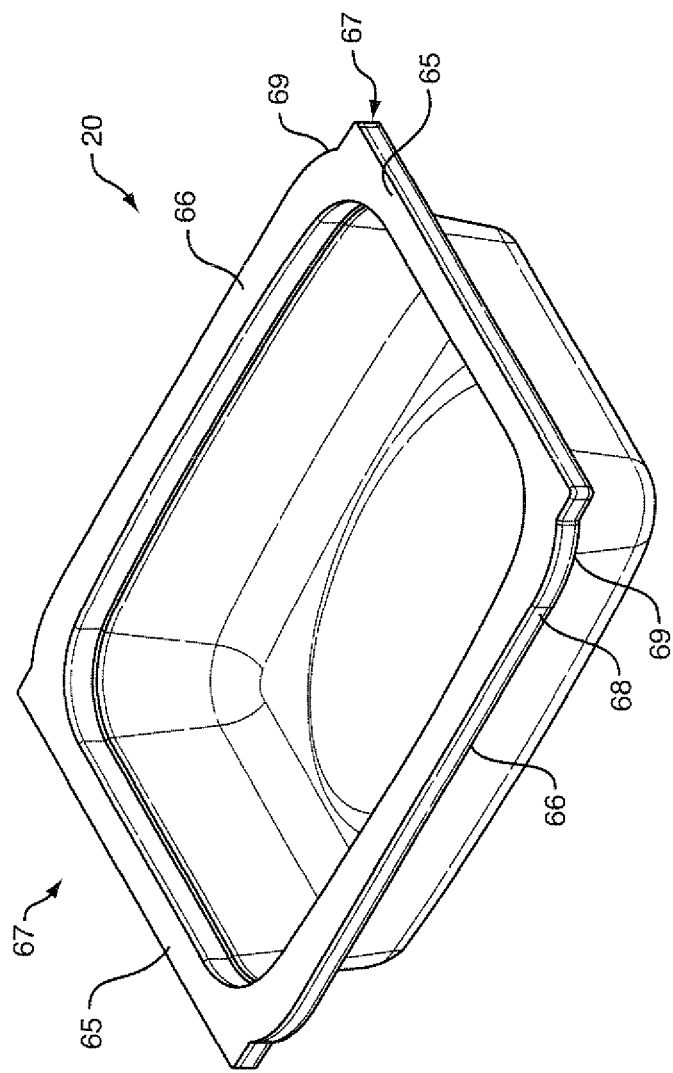
FIG. 9 illustrates a package having tabs shaped to engage the conveyor belts.

In the example shown in FIG. 9, the package 20 includes front and rear edges 66 and side edges 65. The front and rear edges 66 preferably intersect the side edges 65 at rounded corners 69. Each of two side edges 65 are formed with tabs 67 extend laterally beyond the rounded corners and preferably beyond an upper lip 68 of each side edge 65. The width and height of tabs 67 are chosen so as to firmly engage and be received within the belt's slots 60. It should be understood that other shapes for tabs 67 and slots 20 are possible. For example, each side of the package 20 may have multiple tabs 67.

The number and location of the supports 80 can differ depending upon the length of the conveyor and other factors, such as the weight of the packages 20, or the size of the applicator cavity.

The supports 80 are preferably located outside of the applicator, to avoid impacting the desired radiation pattern. This is especially important in a case where the conveyor moves the packages 20 through water, such as may be done in a sterilization operation.

Figure 10:
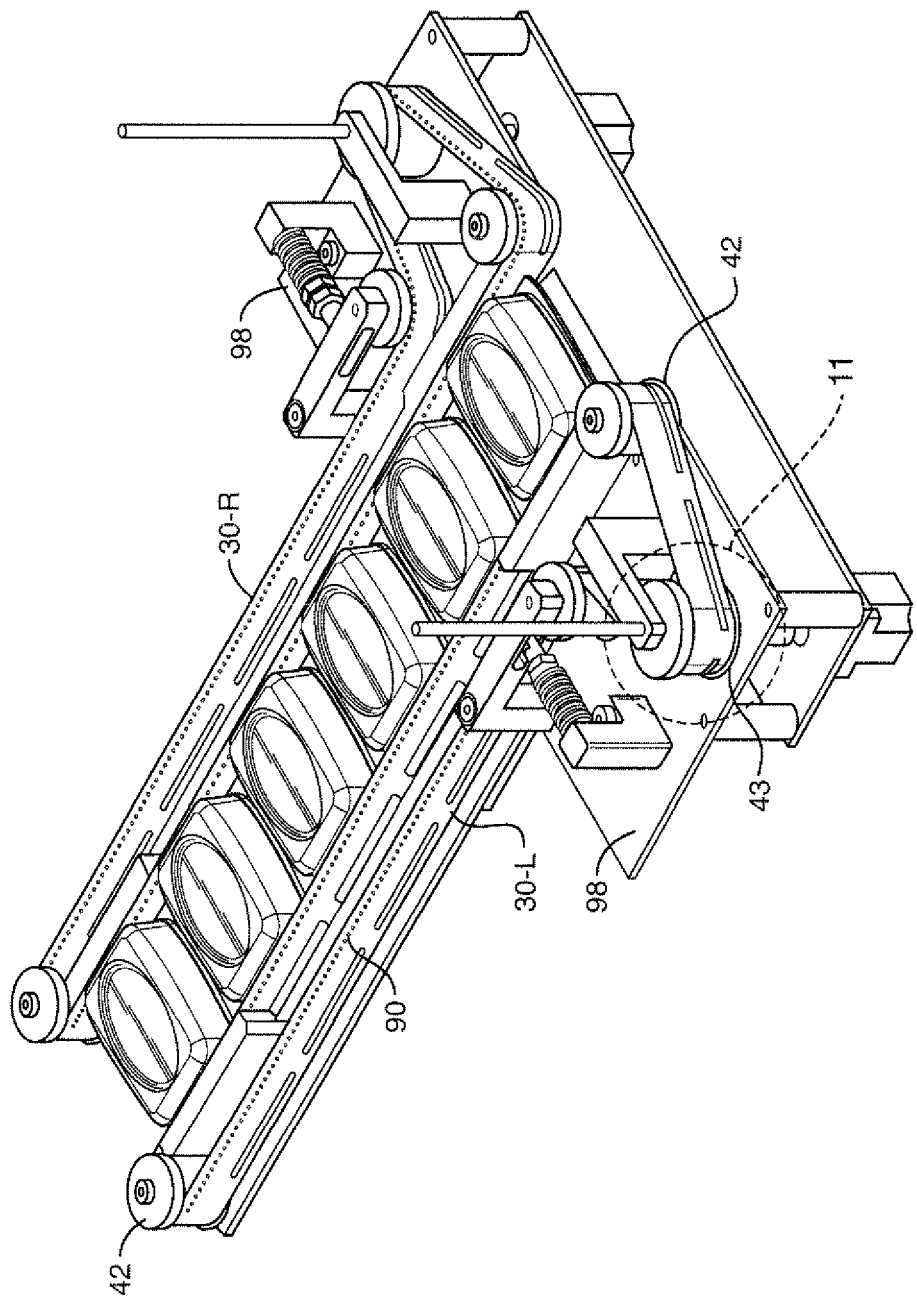
FIG. 10 is another implement showing conveyor belts that use drive rollers having sprockets.
Figure 11:
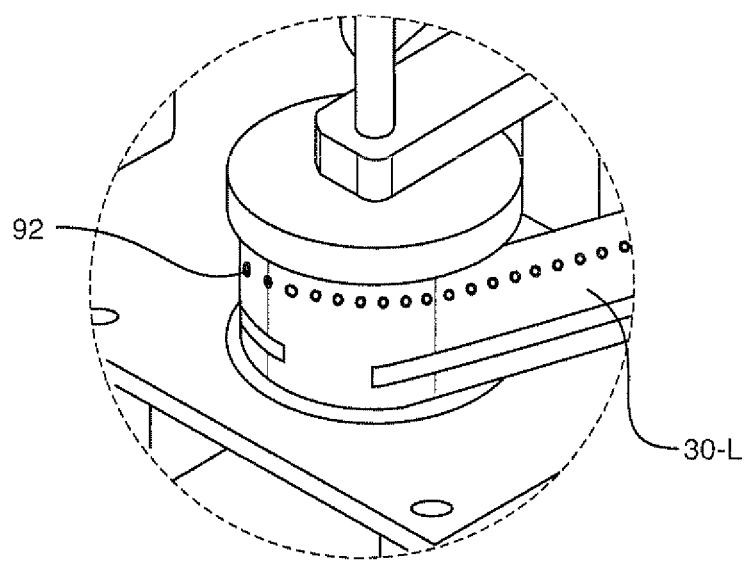
FIG. 11 is a close-up of the drive roller of FIG. 10.

FIG. 10 is an isometric view of an arrangement similar to that of FIG. 1 but where a row of holes 90 are formed in the belts 30-L and 30-R. Best visible in the close-up view of FIG. 11, sprockets 92 are formed in one or more of the drive roller 43 and/or guide roller(s) 42. The sprockets 42 engage holes 90 to provide a more positive engagement mechanism between motor 40 and belts 30.

In addition, tensions 98 can be used to prevent slack in the belts 30. However, in other end uses, it is possible to form the supports from a microwave inert material, and introduce them into the cavity.

While this invention has been particularly shown and described with references to example embodiments thereof, it will be understood by those skilled in the art that various changes in form and details may be made therein without departing from the scope of the invention encompassed by the appended claims.

What is claimed is:

1. A microwave conveyor system for microwave process of products:
   a microwave applicator for producing a microwave field for processing products;
   a package storing a product for microwave application, said package having a top, a bottom and a pair of opposed periphery edges including a first periphery edge and second periphery edge located at the opposite side of said package as said first periphery edge;
   a conveyor for receiving and then transporting said package and product through said microwave field and for releasing said package and product after being transported through said microwave field, said conveyor including first and second opposed belts and a drive mechanism for moving said belts in synchronized movement in a first direction;
   means for engaging and supporting said package's opposed periphery edges by said opposed belts wherein said package is a engaged and supported in said microwave field only at said package's opposed periphery edges by said first opposed belt engaging and supporting said package's first periphery edge and said second opposed belt engaging and supporting said packages second periphery edge.

2. The microwave conveyor system of claim 1 wherein said means for engaging and supporting said package's opposed periphery edges includes opposed slots formed in opposed belts receiving said package's opposed periphery edges.

3. The microwave conveyor system of claim 1 wherein said opposed belts are not metallic.

* * * * *